US012764633B2

(12) United States Patent
Colom Ikuno et al.

(10) Patent No.: US 12,764,633 B2
(45) Date of Patent: Oct. 13, 2026

(54) TRANSMITTING AND/OR USING USER EQUIPMENT ROUTE SELECTION POLICY INFORMATION WHEN OPERATING A USER EQUIPMENT

(71) Applicant: DEUTSCHE TELEKOM AG, Bonn (DE)

(72) Inventors: Josep Colom Ikuno, Korneuburg (AT); Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 239 days.

(21) Appl. No.: 18/832,150

(22) PCT Filed: Jan. 9, 2023

(86) PCT No.: PCT/EP2023/050307
§ 371 (c)(1),
(2) Date: Jul. 23, 2024

(87) PCT Pub. No.: WO2023/143892
PCT Pub. Date: Aug. 3, 2023

(65) Prior Publication Data
US 2025/0119816 A1 Apr. 10, 2025

(30) Foreign Application Priority Data
Jan. 28, 2022 (EP) .................................... 22153866

(51) Int. Cl.
*H04W 40/24* (2009.01)

(52) U.S. Cl.
CPC .................................. *H04W 40/24* (2013.01)

(58) Field of Classification Search
None
See application file for complete search history.

(56) References Cited

U.S. PATENT DOCUMENTS

2021/0058784 A1 2/2021 Kedalagudde et al.
2021/0410059 A1 12/2021 Talebi Fard et al.
(Continued)

FOREIGN PATENT DOCUMENTS

CN 113630843 A 11/2021
WO WO 2021045859 A1 3/2021
(Continued)

OTHER PUBLICATIONS

Ericsson et al, "KI#2—Solution#46—Propose resolution of Editor s Notes", vol. {0} SA WG2, No. {0} Elbonia; Oct. 12, 2020-Oct. 23, 2020, Oct. 26, 2020 (Oct. 26, 2020), pp. 1-9, 3GPP Draft; S2-2007836, 3rd Generation Partnership Project (3GPP), Mobile Competence Centre; 650, Route Des Lucioles, F-06921 Sophia-Antipolis Cedex; France, Retrieved from the Internet: URL https://ftp.3gpp.org/tsg_sa/WG1_Arch/TSGS2_141e_Electronic/Docs/S2-2007836.zip, XP051948092 [retrieved on Oct. 26, 2020].

*Primary Examiner* — Phirin Sam
(74) *Attorney, Agent, or Firm* — Leydig, Voit & Mayer, Ltd.

(57) ABSTRACT

A method for operating a user equipment includes: in case that an access mode-related validity element corresponds to access mode configuration information of the user equipment, the user equipment applies user equipment route selection policy information by routing traffic that matches the user equipment route selection policy information according to the user equipment route selection policy information; and in case that the access mode-related validity element does not correspond to the access mode configuration information of the user equipment, the user equipment skips the user equipment route selection policy information.

8 Claims, 2 Drawing Sheets

(56) References Cited

U.S. PATENT DOCUMENTS

| | | | | |
|---|---|---|---|---|
| 2023/0069252 | A1 | 3/2023 | Zhu et al. | |
| 2023/0370944 | A1* | 11/2023 | Li | H04W 28/0268 |
| 2024/0137855 | A1* | 4/2024 | Adjakple | H04W 40/24 |
| 2024/0172106 | A1* | 5/2024 | Ke | H04L 67/51 |
| 2024/0396853 | A1* | 11/2024 | Gkatzikis | H04L 49/253 |
| 2025/0031171 | A1* | 1/2025 | Starsinic | H04W 60/04 |
| 2025/0317842 | A1* | 10/2025 | Ninglekhu | H04W 48/18 |

FOREIGN PATENT DOCUMENTS

| | | | |
|---|---|---|---|
| WO | 2021067030 | A1 | 4/2021 |
| WO | 2021141707 | A1 | 7/2021 |
| WO | WO 2021227627 | A1 | 11/2021 |
| WO | WO 2021233554 | A1 | 11/2021 |

* cited by examiner

| # | PLMN ID, NID | Description |
|---|---|---|
| 1 | 232 01 | Operator 01 |
| 2 | 232 02 | Operator 02 |
| 3 | 232 03 | Operator 03 |
| 4 | 232 06 000014C601 | SNPN by Operator 06 for enterprise 5318 (0x14C6) |
| 5 | 232 06 0000020101 | SNPN by Operator 06 for enterprise 513 (0x201) |
| 6 | 999 99 000014C602 | SNPN by enterprise 5318 (0x14C6) |
| 7 | 999 99 00006D2401 | SNPN by enterprise 27940 (0x6D24) |
Fig. 4
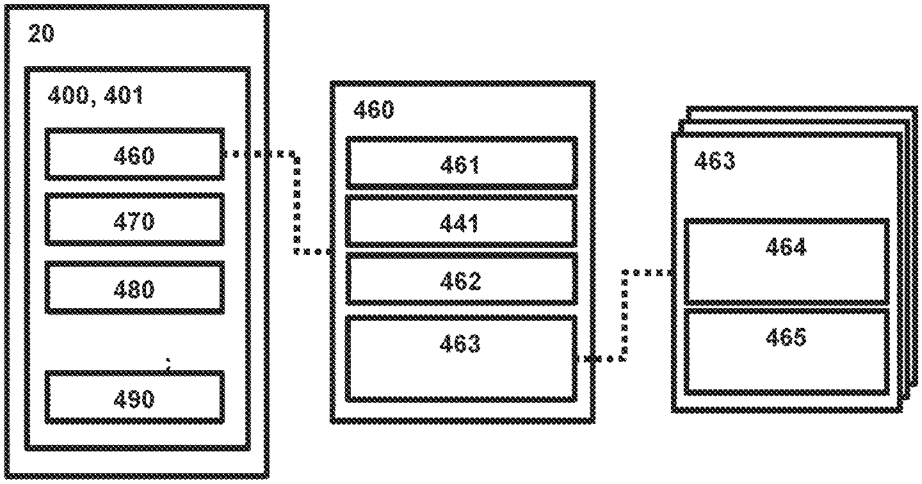
Fig. 5
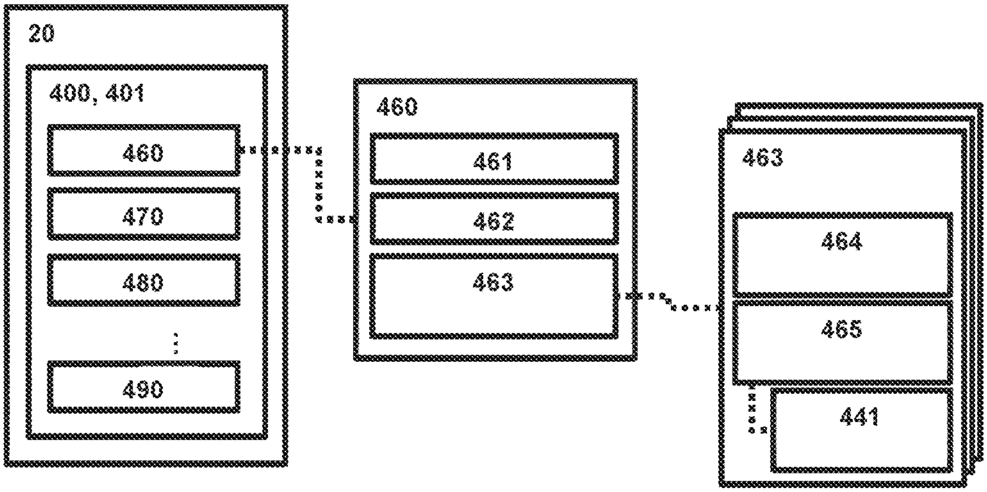
Fig. 6

TRANSMITTING AND/OR USING USER EQUIPMENT ROUTE SELECTION POLICY INFORMATION WHEN OPERATING A USER EQUIPMENT

CROSS-REFERENCE TO PRIOR APPLICATIONS

This application is a U.S. National Phase application under 35 U.S.C. § 371 of International Application No. PCT/EP2023/050307, filed on Jan. 9, 2023, and claims benefit to European Patent Application No. EP 22153866.3, filed on Jan. 28, 2022. The International Application was published in English on Aug. 3, 2023 as WO 2023/143892 A1 under PCT Article 21(2).

FIELD

The present invention relates a method for transmitting and/or using user equipment route selection policy information when operating a user equipment, or when operating a user equipment connected to a telecommunications network, wherein the user equipment comprises, for a given access technology, access mode configuration information, the access mode configuration information relating to or indicating a first network selection mode and at least a second network selection mode that the user equipment is alternatively able to use.

Furthermore, the present invention relates to a user equipment for receiving and/or using user equipment route selection policy information when being operated, or when being operated in connection to a telecommunications network, wherein the user equipment comprises, for a given access technology, access mode configuration information, the access mode configuration information relating to or indicating a first network selection mode and at least a second network selection mode that the user equipment is alternatively able to use.

Additionally, the present invention relates to a system or telecommunications network for transmitting and/or using user equipment route selection policy information when operating a user equipment, or when operating a user equipment connected to a telecommunications network, wherein the user equipment comprises, for a given access technology, access mode configuration information, the access mode configuration information relating to or indicating a first network selection mode and at least a second network selection mode that the user equipment is alternatively able to use.

Furthermore, the present invention relates to a program and to a computer-readable medium for transmitting and/or using user equipment route selection policy information according to a method according to an exemplary embodiment of the present invention.

BACKGROUND

In conventionally known telecommunications networks, in case that uplink traffic needs to be steered, a 5G mobile communication network or 5G system also defines user equipment route selection policies (or UE Routing Policies, URSPs), defined in TS 24.526, that allow the network to mandate the user equipment a set of rules on how to route data packets, i.e., based on a set of rules, such rules indicate or mandate the user equipment to steer specific traffic to a given PDU (protocol data unit) session.

With the introduction, as of 3GPP Rel'16, of standalone non-public networks (SNPNs) which are private, 5G-based networks, also a standalone non-public network access mode has been introduced, in addition to the normal access mode. A standalone non-public network-enabled user equipment supports the standalone non-public network access mode; when the user equipment is set to operate in SNPN-access mode, the user equipment only selects and registers with standalone non-public networks over Uu as described in clause 5.30.2.4, of 3GPP TS 23.501. This results in user equipments (which are supporting standalone non-public networks) being able to switch between two operating modes—i.e. such operating modes corresponding to the standalone non-public network access mode and the normal access mode (i.e. in case that only public land mobile networks are allowed to access). When in a specific access mode, user equipments apply specific network selection procedures, resulting in, for a given access technology (e.g. 5G), different user equipment behavior depending on the access mode the user equipment operates in at that moment. Furthermore, within system procedures, specific SNPN-specifics may not be supported in normal access mode (e.g. certain authentication procedures) and PLMN-specifics may not be supported in SNPN mode (e.g. inter-operator roaming). Hence, depending on the type of network a given user equipment wishes to access, the network selection mode or network access mode is able to be switched or able to be changed.

However, among such standalone non-public network-enabled user equipments that are additionally able to be connected to public land mobile networks, potential conflict situations may arise between, on the one hand, user equipment route selection policy rules or user equipment route selection policy information having been transmitted or provided to the user equipment and to be applied by such a user equipment, and, on the other hand, a considered current situation or context of the user equipment, especially the access situation of the user equipment.

SUMMARY

In an exemplary embodiment, the present invention provides a method for operating a user equipment. The user equipment comprises, for a given access technology, access mode configuration information, the access mode configuration information relating to or indicating a first network selection mode and at least a second network selection mode that the user equipment is alternatively able to use, wherein each of the network selection modes allows the user equipment to select telecommunications networks based on different kinds or sets of information elements identifying each telecommunications network and/or indicating the capabilities of each telecommunications network, wherein a predefined first set of networks is related to the first network selection mode and a predefined second set of networks is related to the second network selection mode, wherein the predefined first set of telecommunications networks corresponds to or comprises public land mobile networks, wherein the predefined second set of telecommunications networks corresponds to or comprises standalone non-public networks. The method comprises: obtaining, by the user equipment, user equipment route selection policy information, wherein the user equipment route selection policy information comprises an access mode-related validity element related to content of the access mode configuration information: determining, by the user equipment, whether or not the access mode-related validity element corresponds to the access mode configuration information of the user equipment; and handling, by the user equipment, the user equipment route selection policy information based on the determination of whether or not the access mode-related validity element corresponds to the access mode configuration information of the user equipment. In case that the access mode-related validity element corresponds to the access mode configuration information of the user equipment, the user equipment applies the user equipment route selection policy information by routing traffic that matches the user equipment route selection policy information according to the user equipment route selection policy information; and in case that the access mode-related validity element does not correspond to the access mode configuration information of the user equipment, the user equipment skips the user equipment route selection policy information

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4 schematically illustrates an exemplary list of available public land mobile networks and standalone non-public networks.

FIG. 5 schematically illustrates an embodiment of the structure of user equipment route selection policy information according to the present invention.

FIG. 6 schematically illustrates another embodiment of the structure of user equipment route selection policy information according to the present invention.

DETAILED DESCRIPTION

Figure 1:
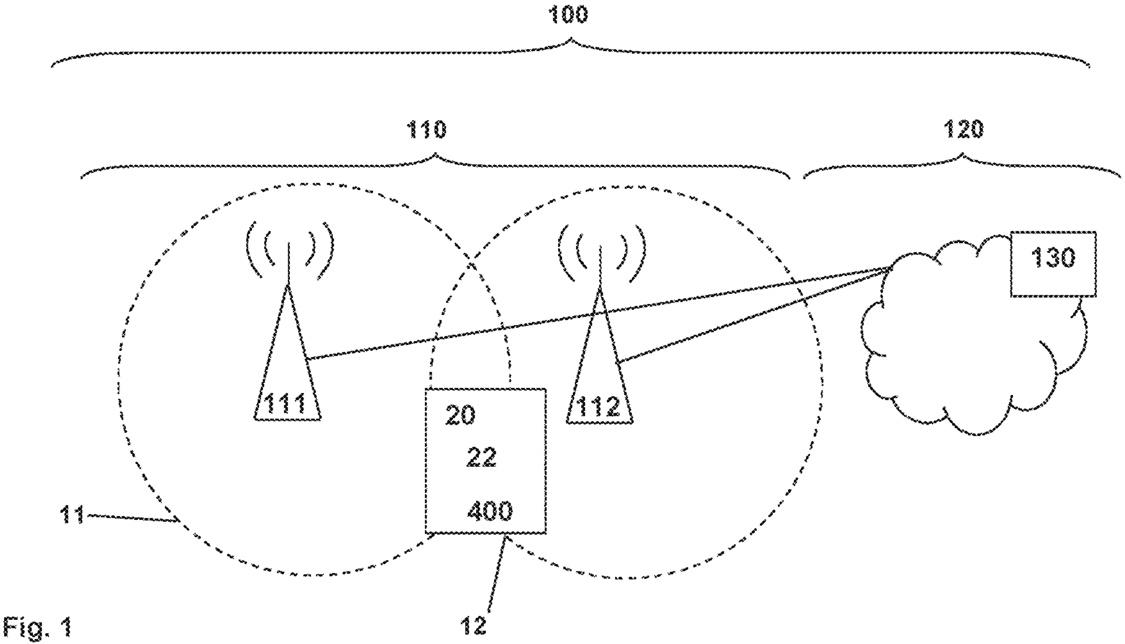
FIG. 1 schematically illustrates a telecommunications network comprising an access network, a core network and a user equipment, wherein the user equipment comprises, for a given access technology, access mode configuration information relating to or indicating a first network selection mode and at least a second network selection mode that the user equipment is alternatively able to use, and wherein the user equipment comprises user equipment route selection policy information comprising an access mode-related validity element.

Exemplary embodiments of the present invention provide a technically simple, effective and cost effective solution for transmitting and/or using user equipment route selection policy information when operating a user equipment, or when operating a user equipment connected to a telecommunications network, wherein the user equipment comprises, for a given access technology, access mode configuration information, the access mode configuration information relating to or indicating a first network selection mode and at least a second network selection mode that the user equipment is alternatively able to use. Further exemplary embodiments of the present invention provide a corresponding user equipment, system or telecommunications network, and a corresponding program and computer-readable medium.

In an exemplary embodiment, the present invention provides a method for transmitting and/or using user equipment route selection policy information when operating a user equipment, or when operating a user equipment connected to a telecommunications network, wherein the user equipment comprises, for a given access technology, access mode configuration information, the access mode configuration information relating to or indicating a first network selection mode and at least a second network selection mode that the user equipment is alternatively able to use, wherein the user equipment route selection policy information comprises an access mode-related validity element wherein, in order to transmit and/or use a specific user equipment route selection policy information, the method comprises the following steps:

in a first step, the user equipment comprises or receives the specific user equipment route selection policy information to be evaluated, wherein the specific user equipment route selection policy information comprises a specific access mode-related validity element, in a second step, the specific user equipment route selection policy information is potentially applied, or not applied, by the user equipment, depending on whether the specific access mode-related validity element of the specific user equipment route selection policy information corresponds to the access mode configuration information or not.

It is thereby advantageously possible according to the present invention to be able to transmit—by the telecommunications network (or an access network component thereof) and to the user equipment—, as part of the specific user equipment route selection policy information, the specific access mode-related validity element of the specific user equipment route selection policy information.

Hence, it is especially advantageously possible, according to the present invention, that the user equipment applies the user equipment route selection policy information in a flexible manner, i.e. to apply the specific user equipment route selection policy information or not, depending on whether the specific access mode-related validity element of the specific user equipment route selection policy information corresponds to the access mode configuration information of the user equipment or not.

Hence, especially potential conflict situations of standalone non-public network-enabled user equipments are able to be avoided. In such situations, the user equipment route selection policy rules or the user equipment route selection policy information that is present at such a user equipment (i.e. having been (previously) transmitted to or provided to the user equipment and which is to be applied by such a user equipment) might clash (or be in conflict) with the current situation or context of that user equipment.

In currently known telecommunications networks (i.e. according to the presently defined standards or standard documents regarding such networks), it is allowed that credentials of a public land mobile network (PLMN credentials) are used for accessing standalone non-public networks: in this case, there might be a potential mismatch between such user equipment route selection policy rules (or user equipment route selection policy information)—that are set by the public land mobile network—and their application in a standalone non-public network setting (i.e. the situation where that same user equipment is connected to a standalone non-public network) and/or vice-versa: Such potential conflicts may, e.g., arise from the non-specificity of the application of user equipment route selection policy information (e.g. user equipment route selection policy information provided by the standalone non-public network override user equipment route selection policy information provided by the public land mobile network, or vice versa).

According to the present invention, via the specific user equipment route selection policy information comprising the specific access mode-related validity element, and by applying the specific user equipment route selection policy information in dependency on whether the specific access mode-related validity element (of the specific user equipment route selection policy information) corresponds to the presently applicable or suitable access mode configuration information (i.e. corresponding to or reflecting the current state or situation of the considered user equipment), it is advantageously possible to realize an application of enhanced user equipment route selection policy information with multi-network rule support. Especially, this allows for a more flexible application of URSPs and user equipment route selection policy information in standalone non-public networks-especially in case that PLMN credentials are used for accessing standalone non-public networks.

Furthermore according to the present invention, the telecommunications network typically comprises an access network and a core network: however, the present invention is also related to situations where the telecommunications network does not comprise, strictly speaking, both an access network and a core network, but where the telecommunications network is only associated or assigned to an access network (and especially comprises the core network), or where the telecommunications network is only associated or assigned to a core network (and especially comprise the access network), or where the telecommunications network is only associated or assigned to both an access network and a core network. According to the present invention, the core network especially provides the user equipment with data connectivity towards a data network.

In conventionally known telecommunications networks, a user equipment is typically able to be connected, via the core network, to a data network. The user equipment typically communicates with the access network (or radio access network) via an interface, typically a radio interface or air interface. This is used for conveying both signaling information and data traffic, but there is typically a logical separation (logical channels) for the transport of both types of traffic. Likewise between the access network (especially the radio access network, and especially a gNB base station entity) and the core network, signaling information and user data are typically separated.

In order to establish a data connection enabling a user equipment to communicate with a data network, a protocol data unit (PDU) session is required. A PDU session is a logical data transport channel terminated at the core network that provides connectivity to a data network. The termination point of a given PDU session (user plane function according to, e.g., the 5G standard) is termed PDU session anchor (PSA). While a user equipment moves (handover procedures occur between the user equipment and different gNBs or base station entities), the PDU session anchor is, normally and typically, expected to remain constant. A PDU session can have one or more an associated quality-of-service for the underlying transported data (e.g. one or more QoS flows within the PDU session).

In currently known telecommunications networks as well as according to the present invention, user equipment route selection policy information or user equipment route selection policy rules is/are used by the telecommunications network to oblige user equipments to use a set of rules to apply to, or steer, uplink traffic, i.e. how to route data packets. In the context of the present invention, the user equipment route selection policy information (either stored by the user equipment or received by the user equipment) might comprise one or a plurality of user equipment route selection policy rules. Especially such user equipment route selection policy rules indicate or mandate the user equipment to steer specific traffic to a given, or predetermined. PDU (protocol data unit) session. Especially such user equipment route selection policy rules or such user equipment route selection policy information is set or defined by the core network of the telecommunications network. i.e. the telecommunications network (core network thereof) sets a specific user equipment route selection policy rule or user equipment route selection policy information via transmitting a corresponding message to the user equipment as part of the control data flow exchange between the telecommunications network and the user equipment over the air interface between the user equipment and the corresponding access network element, typically a base station entity such as, e.g., a gNodeB entity. As a consequence of the user equipment receiving such a user equipment route selection policy rule (or plurality thereof) or user equipment route selection policy information, the user equipment will apply such rule information, i.e. traffic, especially application traffic (in uplink direction, towards the telecommunications network) that matches the corresponding user equipment route selection policy rule or user equipment route selection policy information is routed, by the user equipment, as mandated or prescribed by the user equipment route selection policy rule/information.

In currently known telecommunications networks, the user equipment route selection policy rules or user equipment route selection policy information itself, i.e. especially its structure, is defined in 3GPP TS 23.503 and is a set of one or more URSP rules, where a URSP rule is generally composed of three parts, namely a precedence value as the first part, a traffic descriptor as the second part, and one or more route selection descriptors as the third part.

The precedence value (as the first part of a user equipment route selection policy rule) of the URSP rule identifies the precedence of the considered URSP rule among all the existing URSP rules (either already present at the user equipment or transmitted as part of the user equipment route selection policy information). The traffic descriptor (as the second part of a user equipment route selection policy rule) includes either a match-all traffic descriptor, or at least one of the following components: one or more application identifiers, one or more IP 3 tuples as defined in 3GPP TS 23.503, i.e. the destination IP address, the destination port number, and the protocol in use above the IP, one or more non-IP descriptors, i.e. destination information of non-IP traffic, one or more DNNs (data network name), one or more connection capabilities, one or more domain descriptors, i.e. destination FQDN(s) (fully qualified domain name(s)). Each route selection descriptor (as the third part of a user equipment route selection policy rule) consists of a precedence value of the route selection descriptor and either a non-seamless non-3GPP offload indication, or one PDU session type and, optionally, one or more of the following: SSC mode (session and service continuity mode), one or more S-NSSAIs (Single Network Slice Selection Assistance Information), one or more DNNs, a preferred access type, a multi-access preference, a time window, and location criteria.

In this context, the time window indication and the location criteria are part of the route selection descriptor (or third part of a user equipment route selection policy rule) even though they do not actually describe the traffic routing but, rather, correspond to route selection validation criteria: a given or considered route selection descriptor is not considered valid unless all the provided validation criteria are met and controls the validity of said element. The components describing the actual routing correspond to route selection components.

Regarding the application of user equipment route selection policy rules or user equipment route selection policy information, (specified in TS 23.503, 6.6.2.3), for every newly detected application (i.e. requiring an uplink data stream to be transmitted by the user equipment), the user equipment evaluates the available (i.e. stored or received) URSP rules in the order of rule precedence and determines if the application is matching the traffic descriptor of any URSP rule: when a URSP rule is determined to be applicable for a given application (clause 6.6.2.1), the user equipment shall select a route selection descriptor within this URSP rule in the order of the route selection descriptor precedence: if the user equipment determines that there is more than one matching and existing PDU Session (e.g. the selected route selection descriptor only specifies the network slice selection, while there are multiple existing PDU Sessions matching the network slice selection with different DNNs), it is up to user equipment implementation to select one of them to use.

In conventionally known telecommunications networks, there is no relationship between the access mode a user equipment is operating into and what or how user equipment route selection policy rules are or user equipment route selection policy information is applied. Conventionally, URSPs are selectively applicable when a user equipment is registered in a given network (generically applied, regardless of whether the network is or has been identified by a PLMN ID only or by a combination of the PLMN ID and the NID).

According to the present invention, the user equipment comprises, for a given access technology (i.e. especially regarding each access technology for which standalone non-public networks might be accessible), access mode configuration information. The access mode configuration information relates to or indicates a first network selection mode and at least a second network selection mode that the user equipment is alternatively able to use.

In this respect, especially the concept of user equipments being allowed to also access standalone non-public networks is relevant: These standalone non-public networks have the particularity that additional network identifiers are used: while for public land mobile networks, the PLMN ID (public land mobile network identifier. i.e. a combination of mobile country code (MCC) and the mobile network code (MNC)), is assumed to be unique, standalone non-public networks are designed with the assumption that the PLMN ID they use is not (necessarily) unique (e.g. a PLMN ID of "999 99" is or might be operatively used), and introduce an additional identifier, the network identifier (NID). As defined in 3GPP TS 23.501, the combination of a PLMN ID and a network identifier (NID) identifies a standalone non-public network, and the PLMN IDs reserved for use by private networks can be used for non-public networks (e.g. based on mobile country code (MCC) "999" as assigned by ITU). Alternatively however, a PLMN operator might use its PLMN IDs for SNPN(s) along with NID(s), but registration in a PLMN and mobility between a PLMN and an SNPN are not supported using an SNPN subscription, especially due to the SNPNs typically not relying on network functions provided by the PLMN.

Hence, in case a SNPN-enabled user equipment supports the SNPN access mode, when such a user equipment is set to operate in SNPN access mode, the user equipment only selects and registers with SNPNs (over Uu as described in clause 5.30.2.4). This results in such user equipments (i.e. supporting SNPNs) being able to switch between two operating modes. i.e. the first network selection mode and at least a second network selection mode, that the user equipment is alternatively able to use. e.g. SNPN access mode and the normal (or PLMN) access mode (more than two of such different access modes are possible according to the present invention and are not excluded). Hence, in such a scenario, depending on the type of network the user equipment wishes to access, this network selection mode (i.e. the access mode configuration information, or, rather, its content) can be switched. According to the present invention, the user equipment route selection policy information comprises an access mode-related validity element that is related to the content of the access mode configuration information. Hence, in case of a specific user equipment route selection policy information being present (i.e. stored) at the user equipment (i.e. the user equipment comprises such user equipment route selection policy information) or received by the considered user equipment, the specific user equipment route selection policy information is potentially applied, or not applied, by the user equipment, depending on whether the specific access mode-related validity element (of the specific user equipment route selection policy information) corresponds to the access mode configuration information or not, i.e. if it matches the content of the access mode configuration information.

Hence via the user equipment route selection policy information comprising the access mode-related validity element (that is related to the content of the access mode configuration information), and via the user equipment applying the specific user equipment route selection policy information, depending on the specific access mode-related validity element, it is advantageously possible to avoid potential conflict situations between, on the one hand, user equipment route selection policy information (without such access mode-related validity element), and, on the other hand, a current situation or context of the user equipment.

According to the present invention, it is advantageously possible and preferred that—in the second step—the specific user equipment route selection policy information is able to be applied in case that the specific access mode-related validity element corresponds to the access mode configuration information of the user equipment, and wherein the specific user equipment route selection policy information is not applied in case that the specific access mode-related validity element does not correspond to the access mode configuration information of the user equipment.

It is thereby advantageously possible to realize and implement a method according to an exemplary embodiment of the present invention in a comparatively simple and efficient manner.

According to the present invention, it is furthermore advantageously possible and preferred that the specific user equipment route selection policy information comprises— besides a precedence value, a traffic descriptor and at least one route selection descriptor—the specific access mode-related validity element.

Via the specific user equipment route selection policy information comprising the specific access mode-related validity element besides a precedence value, a traffic descriptor and at least one route selection descriptor, it is advantageously possible according to the present invention that the access mode-related validity element is added at root level of the respective user equipment route selection policy rule, resulting in the corresponding user equipment route selection policy rule being only valid when the user equipment is connected to a given network using the network access mode or modes specified by the access mode-related validity element: as such, the evaluation of the whole user equipment route selection policy rule (e.g. the traffic descriptor) is able to be skipped if the criteria is not matched; hence the processing is able to be faster and more efficient.

According to the present invention, it is furthermore advantageously possible and preferred that the specific user equipment route selection policy information comprises the specific access mode-related validity element as part of at least one route selection descriptor.

Via the specific user equipment route selection policy information comprising the specific access mode-related validity element as part of at least one route selection descriptor, it is advantageously possible according to the present invention that the validity of each routing entry is able to be controlled.

Furthermore, it is advantageously possible and preferred according to the present invention that the specific user equipment route selection policy information comprises at least one user equipment route selection policy rule, wherein the specific access mode-related validity element is part of the user equipment route selection policy rule, especially as part of at least one route selection descriptor, and/or besides a precedence value, a traffic descriptor and at least one route selection descriptor.

Via the specific user equipment route selection policy information comprising at least one user equipment route selection policy rule, it is advantageously possible to use established mechanisms to realize a method according to an exemplary embodiment of the present invention.

Furthermore, it is advantageously possible and preferred according to the present invention that each of the network selection modes allows the user equipment to select telecommunications networks based on different kinds or sets of information elements identifying each telecommunications network and/or indicating the capabilities of each telecommunications network, wherein especially the network selection modes also rely on information stored in the user equipment, wherein especially a first set of networks is related to the first network selection mode and a second set of networks is related to the second network selection mode.

Via defining the different network selection modes (at least two but preferably more than two) such that it is allowed to the user equipment to select telecommunications networks based on different kinds or sets of information elements identifying each telecommunications network and/or kinds or sets of information elements indicating the capabilities of each telecommunications network, it is advantageously possible according to the present invention to flexibly adapt the behavior of the user equipment and the telecommunications network to the respectively appropriate needs thereof.

According to a further preferred embodiment of the present invention, the predefined first set of telecommunications networks corresponds to or comprises public land mobile networks, especially being defined solely by a mobile country code information and a mobile network code information, wherein the predefined first set of telecommunications networks especially comprises only such public land mobile networks, and wherein the predefined second set of telecommunications networks corresponds to or comprises standalone non-public networks, especially being defined by a mobile country code information, a mobile network code information in addition to a network identifier information, wherein the predefined second set of telecommunications networks especially comprises only such standalone non-public networks.

It is thereby advantageously possible that the different network selection modes are able to be easily and efficiently configured in order to realize a method according to an exemplary embodiment of the present invention.

It is thereby advantageously possible to easily and efficiently realize a method according to an exemplary embodiment of the present invention.

Furthermore, the present invention relates to a user equipment for receiving and/or using user equipment route selection policy information when being operated, or when being operated in connection to a telecommunications network, wherein the user equipment comprises, for a given access technology, access mode configuration information, the access mode configuration information relating to or indicating a first network selection mode and at least a second network selection mode that the user equipment is alternatively able to use, wherein the user equipment route selection policy information comprises an access mode-related validity element wherein, in order to receive and/or use a specific user equipment route selection policy information, the user equipment is configured such that:

the user equipment comprises or receives the specific user equipment route selection policy information to be evaluated, wherein the specific user equipment route selection policy information comprises a specific access mode-related validity element, the specific user equipment route selection policy information is potentially applied, or not applied, by the user equipment, depending on whether the specific access mode-related validity element of the specific user equipment route selection policy information corresponds to the access mode configuration information or not.

Furthermore, the present invention relates to a system or telecommunications network for transmitting and/or using user equipment route selection policy information when operating a user equipment, or when operating a user equipment connected to a telecommunications network, wherein the user equipment comprises, for a given access technology, access mode configuration information, the access mode configuration information relating to or indicating a first network selection mode and at least a second network selection mode that the user equipment is alternatively able to use, wherein the user equipment route selection policy information comprises an access mode-related validity element wherein, in order to transmit and/or use a specific user equipment route selection policy information, the system or telecommunications network is configured such that:

the user equipment comprises or receives the specific user equipment route selection policy information to be evaluated, wherein the specific user equipment route selection policy information comprises a specific access mode-related validity element, the specific user equipment route selection policy information is potentially applied, or not applied, by the user equipment, depending on whether the specific access mode-related validity element of the specific user equipment route selection policy information corresponds to the access mode configuration information or not.

Additionally, the present invention relates to a program comprising a computer readable program code and/or a computer-readable medium comprising instructions, which, when executed on a computer and/or on a user equipment and/or on a network node of a telecommunications network, or in part on the user equipment and/or in part on the network node of a telecommunications network, causes the computer and/or the user equipment and/or the network node of a telecommunications network to perform a method according to an exemplary embodiment of the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 comprising an access network 110, and a core network 120 is schematically shown. The access network 110 comprises a plurality of radio cells 11, 12. In the exemplary situation or scenario shown in FIG. 1, a first base station entity 111 generates or is associated with or spans the first radio cell 11, and a second base station entity 112 generates or is associated with or spans the second radio cell 12. A user equipment 20 comprises, for a given access technology, access mode configuration information 22 relating to or indicating a first network selection mode and at least a second network selection mode that the user equipment is alternatively able to use. Furthermore, the user equipment 20 comprises user equipment route selection policy information 400 comprising an access mode-related validity element.

The user equipment 20 is typically, but not necessarily, mobile i.e. able to move with respect to the (typically, but not necessarily static) radio cells 11, 12 or corresponding base station entities 111, 112 of the access network 110. In the exemplarily represented illustration of FIG. 1, the core network 120 comprises or is connected to a data network 130. The core network 120 provides the user equipment 20 with data connectivity towards the data network 130.

Figure 2:
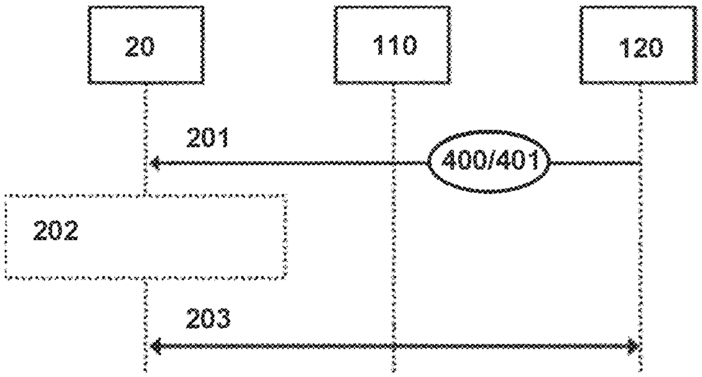
FIG. 2 schematically illustrates the transmission of user equipment route selection policy information towards the user equipment.

In FIG. 2, the transmission of user equipment route selection policy information 400 (or of a specific user equipment route selection policy information 401) towards the user equipment 20 is schematically shown via a communication diagram between the user equipment 20, the access network 110, and the core network 120. According to the present invention, user equipment route selection policy information 400 is (or user equipment route selection policy rules 400 are) used by the telecommunications network 100 to oblige the user equipment 20 to use a set of rules to apply to, or steer, uplink traffic, i.e. how to route data packets are routed towards the core network 120 and/or towards a data network 130. Especially, such user equipment route selection policy information or rules 400 (or such specific user equipment route selection policy information or rules 401) indicate or mandate the user equipment 20 to steer specific traffic to a given, or predetermined. PDU (protocol data unit) session. Especially such (specific) user equipment route selection policy rules or information 400 or 401 is set or defined by the core network 120 of the telecommunications network 100. i.e. the telecommunications network 100 (or the core network 120 thereof) sets the specific user equipment route selection policy rule or information 401 via transmitting (during or using a first processing step 201) a corresponding message to the user equipment 20, especially as part of the control data flow exchange between the telecommunications network 100 and the user equipment 20 over the air interface between the user equipment 20 and the corresponding access network element, typically a base station entity 111, 112 such as, e.g., a gNodeB entity. As a consequence of the user equipment 20 receiving the specific user equipment route selection policy rule (or plurality thereof) 401 or specific user equipment route selection policy information 401, the user equipment 20 applies such rule information (during a second processing step 202). i.e. traffic, especially application traffic (in uplink direction, towards the telecommunications network 100) that matches the corresponding (specific) user equipment route selection policy rule or information 400, 401 is routed (in or during a third processing step 203), by the user equipment 20, as mandated or prescribed by this (specific) user equipment route selection policy rule/information 400, 401.

According to the present invention, the (specific) user equipment route selection policy information 400, 401 itself. i.e. especially its structure, is defined in a manner different to its currently known definition in the current version of 3GPP TS 23.503, as it also comprises, according to the present invention, an access mode-related validity element 441. FIGS. 5 and 6 schematically show different embodiments of the structure of user equipment route selection policy information 400 (or a specific user equipment route selection policy information 401) according to the present invention, wherein the exemplary representation of FIGS. 5 and 6 shows the user equipment route selection policy information 400 to comprise a plurality of user equipment route selection policy rules 460, 470, 480, 490 (i.e. a first user equipment route selection policy rule 460, a second user equipment route selection policy rule 470, a third user equipment route selection policy rule 480, and a fifth user equipment route selection policy rule 490), and wherein, for the sake of simplicity, the structure of only one of these rules (namely user equipment route selection policy rule 460 or first user equipment route selection policy rule 460) is schematically shown: however, it is understood that the other user equipment route selection policy rules 470, 480, 490 are able to be similarly structured.

According to one preferred embodiment of the present invention, shown in FIG. 5, the access mode-related validity element 441 of the user equipment route selection policy rule 460 is a part thereof besides the precedence value 461, the traffic descriptor 462 and at least one route selection descriptor (list) 463, i.e. user equipment route selection policy rule 460 comprises the specific access mode-related validity element 441 besides a precedence value 461, a traffic descriptor 462 and at least one route selection descriptor (list) 463. The route selection descriptor (list) 463 furthermore comprises route selection components 464, and route selection validation criteria 465.

According to another preferred embodiment of the present invention, shown in FIG. 6, the access mode-related validity element 441 of the user equipment route selection policy rule 460 is a part of at least one route selection descriptor (list) 463, i.e. the user equipment route selection policy rule 460 comprises the specific access mode-related validity element 441 as part of the at least one route selection descriptor (list) 463, and besides either besides the route selection components 464 and the route selection validation criteria 465, or as part of the route selection validation criteria 465.

According to the present invention, the (specific) user equipment route selection policy information 400, 401 might comprise either one user equipment route selection policy rule 460 or a plurality of user equipment route selection policy rules 460, 470, 480, 490. In any case, according to the present invention, the access mode-related validity element 441 is preferably part of the one (i.e. only) user equipment route selection policy rule 460 (of the (specific) user equipment route selection policy information 400, 401) or, in case of a plurality of user equipment route selection policy rules 460, 470, 480, 490 present (in the (specific) user equipment route selection policy information 400, 401), the access mode-related validity element 441 is part of one of these user equipment route selection policy rules 460, 470, 480, 490; alternatively, the access mode-related validity element 441 is part of more than one of these user equipment route selection policy rules 460, 470, 480, 490. Both in case of either one user equipment route selection policy rule being present as part of the (specific) user equipment route selection policy element 400, 401 or in case of more than one rule being present, the (specific) access mode-related validity element 441 is especially part of at least one route selection descriptor (list) 463, and/or besides a precedence value 461, a traffic descriptor 462 and at least one route selection descriptor (list) 463 of that user equipment route selection policy rule or rules 460, 470, 480, 490.

Besides the access mode-related validity element 441, the structure of the (specific) user equipment route selection policy information 400, 401 corresponds to the definition as in the current version of 3GPP TS 23.503. i.e. it is or corresponds to a set of one or more URSP rules 460, 470, 480, 490, where the or each URSP rule 460, 470, 480, 490 generally comprises the three parts of a precedence value, a traffic descriptor, and one or more route selection descriptors.

Regarding the user equipment 20 represented in FIGS. 1 and 2, it is assumed that standalone non-public networks (SNPNs) are indeed accessible, e.g. according to the 5G radio access technology. The user equipment 20 comprises, for a given access technology for which standalone non-public networks are possible, the access mode configuration information 22 which relates to (or indicates) either a first network selection mode or a second network selection mode that the user equipment is alternatively able to use: in addition to the first and second network selection mode, further network selection modes are preferably (but not necessarily) possible. e.g. a third network selection mode, obtained from the combination of the available networks in the first and second network selection mode.

Figure 3:
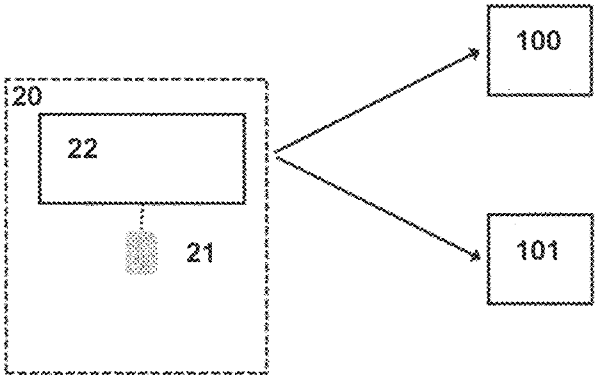
FIG. 3 schematically illustrates a user equipment having access to different network selection modes.

For example, the user equipment 20 is a SNPN-enabled user equipment 20 that supports the SNPN access mode (e.g. corresponding to the first network selection mode). This is schematically illustrated in FIG. 3 which shows the user equipment 20 having access to different network selection modes. The user equipment 20 comprises a universal integrated circuit card or USIM 21 (comprising user or subscriber credentials) and the access mode configuration information 22, the content of which defines or indicates whether the user equipment 20 is, at a considered point in time and regarding network selection, either in the SNPN mode or rather in the PLMN mode (normal mode). The user equipment 20, e.g., accesses the telecommunications network 100, e.g. identified via a PLMN ID of "232 01", in case that the access mode configuration information 22 indicates (or has the content) "PLMN mode" or "normal mode" (e.g. second network selection mode), whereas the user equipment 20 accesses a further telecommunications network 101, e.g. identified via a PLMN ID and network ID of "999 99+00007ed9", in case that the access mode configuration information 22 indicates (or has the content) "SNPN mode" (e.g. first network selection mode).

When in this first network selection mode (SNPN access mode), the user equipment 20 exclusively selects and registers with SNPNs: when in the second network selection mode (normal network selection mode or PLMN access mode), the user equipment 20 e.g. exclusively selects and registers with PLMNs.

According to the present invention, the (specific) user equipment route selection policy information 400, 401 comprises the access mode-related validity element 441 that is related to the content of the access mode configuration information 22 and either matches the access mode configuration information 22 or not. Hence, in case of a specific user equipment route selection policy information 401 being either present (i.e. stored) at or by the user equipment 20 (i.e. the user equipment 20 comprises such a specific user equipment route selection policy information 401) or being received by the user equipment 20, the specific user equipment route selection policy information 401 is applied or not (depending on whether the (content of the) specific access mode-related validity element 441 corresponds to (or matches) the access mode configuration information 22 or not.

In conventionally known telecommunications networks 100, credentials are able to be used for the following scenarios (in the following, 5G nomenclature is used):

- Access to the telecommunications network: this is typically the case (PLMN) of using the subscription data of the user equipment 20 stored in the USIM 21 of the user equipment 20 to register in the telecommunications network 100, especially via the access and mobility management function (AMF):

Access to a given network slice: additionally to the prior, a 5G network can require authentication and provide/reject authorization for access to a specific network slice or specific network slices:

Establishment of a PDU session.

Especially for the second and third possibilities, an external credential server is able to be used. While it is also possible regarding the first possibility (e.g. in case of 5G-based private networks, i.e. SNPNs), it is presently not commonly used in public mobile networks (PLMNs). The credentials used for granting access to a PLMN are, as defined by 3GPP standards, stored in the USIM 21 of the user equipment 20 (either a physical UICC or in electronic form, e.g. eSIM). Other types of credentials may be stored elsewhere but are ultimately used in the communication between the user equipment 20 and the core network 120 to grant access to e.g. a given network slice and/or as part of a PDU establishment procedure.

An important case to consider is when the user equipment 20 requires access to networks other than the one that owns the credentials (e.g. in case of roaming between networks, e.g. PLMNs). In such cases, the core network 120 in the subscriber network communicates with the core network in the visited network. Data flows directly via the visited network towards data networks 130, as well as via the home network 100 are both possible deployment options.

In the case of roaming, conventional telecommunications networks typically operate as follows: The user equipment 20 may be provisioned with URSP rules by the policy and charging function (PCF) of the home network (HPLMN). When the user equipment 20 is roaming, the policy and charging function in the home network (HPLMN) may update the URSP rule in the user equipment 20. For URSP rules, the user equipment 20 shall support the provisioning from the policy and charging function in the home network (HPLMN), as specified in TS 24.501. In addition, the UE may be also pre-configured with URSP rules (e.g. by the operator).

The possibility to support multiple network selection modes exists in 5G networks (and regarding 5G user equipments 20) since release 16. At present, only the possibilities of SNPN access mode and "normal mode" (or "PLMN mode") are mentioned in the respective standardization documents; however, according to the present invention, more than two network selection modes are possible (i.e. the access mode configuration information 22 is able to be set to more than two values or different contents). In the context of the present invention, "network selection mode" is not to be confused with the "access technology" (e.g. "RAT" condition (also mentioned in user equipment route selection policy rules or user equipment route selection policy information): Regarding the present invention, the PLMNs and SNPNs that might be differently accessed dependent on the access mode configuration information 22 of the user equipment 20 are considered as using the same (radio) access technology (e.g. 5G NR) but are accessible via a different access modes.

Hence, with the same set of credentials (e.g. PLMN credentials), the user equipment 20 is able to switch between different network selection modes, where for each network selection mode a different set of parameters is taken into account for network selection (e.g. the access networks are identified by a different set of identifiers). This network selection mode (defined or determined by the access mode configuration information 22) is a matter orthogonal to that of whether the user equipment 20 is in a roaming situation or not.

With regard to FIG. 4, an example of a list of different networks is provided that are, at least in principle (i.e. regarding their physical radio coverage), available to the user equipment 20:

Before the SNPN-mode was introduced, a user equipment supporting 5G in a given location where the seven networks exemplarily provided in FIG. 4 are broadcasting networks identifiers had only a choice among the first three networks, being public land mobile networks having PLMN IDs of "232 01", "232 02", and "232 03".

E.g. at power-up of the user equipment (other conditions might be possible as well), the respective user equipment applies network selection as defined in TS 23.122, chooses one of the available networks, and sends a registration request. Which one of the available networks is actually chosen depends mainly on the HPLMN ID stored in the user equipment credentials, but might also depend on additional parameters.

In case SNPNs are available and the seven networks listed in FIG. 4 (i.e. having PLMN IDs of "232 01", "232 02", and "232 03", "232 06 000014C601", "232 06 000001F701", "999 99 000014C602", and "999 99 00006D2401") are available. All these networks are based on 5G-NR: it is just that SNPNs support additional identifiers (i.e. the network identifier NID) that are not supported by PLMNs. In this sense, it is now possible to implement specific 5G variants supported by specific network selection modes.

The networks the user equipment 20 considers for network selection, regardless of location or what home network identifier its subscription(s) specifies, are:

in PLMN (or normal) access mode (second network selection mode): only the first three (PLMN) networks (having PLMN IDs of "232 01", "232 02", and "232 03") are considered for network selection:

in SNPN access mode (first network selection mode): only networks four to seven (having PLMN IDs or PLMN ID+NID of "232 06 000014C601", "232 06 000001F701", "999 99 000014C602", and "999 99 00006D2401") are considered for network selection. It is to be stressed that the concept of "roaming" is not a factor at network selection, but rather "how the authorization/authentication is performed in PLMNs, i.e. in PLMN (or normal) access mode, when the PLMN ID stored in the UE credentials and the PLMN ID of the network are not the same".

Regardless of the access mode (i.e. the access mode configuration information 22 stored in the user equipment 20), the PLMN ID stored in the UE credentials as "home" is always a factor for network selection algorithms to consider when performing network selection. However, the set of parameters considered for networks selection, as well as how these are considered (e.g. network prioritization) is typically different for PLMN and SNPN access modes.

Currently, PLMN networks (i.e. in the example of FIG. 4, the first three networks) are not considered for network selection when in SNPN access mode, however, according to the present invention, it is conceivable and possible that SNPNs and PLMNs might be able to be accessed when the user equipment 20 is in PLMN access more or in SNPN access mode, especially a first set of a combination of PLMNs and SNPNs when in SNPN access mode and a second set of a combination of PLMNs and SNPNs when in PLMN access mode.

Hence, according to the present invention, it is advantageously possible to add an indication (in the form of the access mode-related validity element 441) to the user equipment route selection policy information 400, especially as part of the route selection descriptor list 363, this indication indicating the validity of a URSP rule (as part of the user equipment route selection policy information 400) when using a given network selection mode, e.g. when in SNPN access mode or when in PLMN (or normal) access mode. Especially, it is proposed to add the access mode-related validity element 441 according to at least two variants: addition to the URSP rule at root level (cf. FIG. 5) or addition to the route selection validation criteria 465 (cf. FIG. 6).

In case of the access mode-related validity element 441 being part of a user equipment route selection policy rule (e.g. 460) at root level, the user equipment route selection policy rule 460 is only valid when the user equipment 20 is connected to a given network using the network access mode or modes specified by the access mode-related validity element 441. As such, the evaluation of the whole user equipment route selection policy rule 460 (e.g. the traffic descriptor) can be skipped if the criteria is not matched.

In case of the access mode-related validity element 441 being part of a user equipment route selection policy rule (e.g. 460) as part of the route selection validation criteria 465, the validity of each routing entry can be controlled.

According to the present invention, it is thereby advantageously possible to evaluate the network validity or the validity of the user equipment route selection policy information 400 (or user equipment route selection policy rule 460) in dependency of the user equipment 20 network selection mode (i.e. whether the user equipment 20 is in SNPN access mode or not).

It is to be understood that whether a user equipment 20 is currently connected via roaming (understood in the general sense as "connected to a network other than the one owning the subscription") or not is able to apply both in SNPN access mode and in PLMN (normal) access mode as well.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a user equipment, wherein the user equipment comprises, for a given access technology, access mode configuration information, the access mode configuration information relating to or indicating a first network selection mode and at least a second network selection mode that the user equipment is alternatively able to use, wherein each of the network selection modes allows the user equipment to select telecommunications networks based on different kinds or sets of information elements identifying each telecommunications network and/or indicating the capabilities of each telecommunications network, wherein a predefined first set of networks is related to the first network selection mode and a predefined second set of networks is related to the second network selection mode, wherein the predefined first set of telecommunications networks corresponds to or comprises public land mobile networks, wherein the predefined second set of telecommunications networks corresponds to or comprises standalone non-public networks, wherein, the method comprises:

obtaining, by the user equipment, user equipment route selection policy information, wherein the user equipment route selection policy information comprises an access mode-related validity element related to content of the access mode configuration information;

determining, by the user equipment, whether or not the access mode-related validity element corresponds to the access mode configuration information of the user equipment; and handling, by the user equipment, the user equipment route selection policy information based on the determination of whether or not the access mode-related validity element corresponds to the access mode configuration information of the user equipment, wherein:

in case that the access mode-related validity element corresponds to the access mode configuration information of the user equipment, the user equipment applies the user equipment route selection policy information by routing traffic that matches the user equipment route selection policy information according to the user equipment route selection policy information; and in case that the access mode-related validity element does not correspond to the access mode configuration information of the user equipment, the user equipment skips the user equipment route selection policy information.

2. The method according to claim 1, wherein the user equipment route selection policy information further comprises a precedence value, a traffic descriptor, and at least one route selection descriptor.

3. The method according to claim 1, wherein the user equipment route selection policy information comprises the access mode-related validity element as part of at least one route selection descriptor.

4. The method according to claim 1, wherein the user equipment route selection policy information comprises at least one user equipment route selection policy rule, wherein the specific-access mode-related validity element is part of the at least one user equipment route selection policy rule.

5. The method according to claim 1, wherein the network selection modes rely on information stored in the user equipment.

6. The method according to claim 1, wherein the predefined first set of telecommunications networks corresponds to or comprises public land mobile networks which are defined solely by a-mobile country code information and a-mobile network code information; and wherein the predefined second set of telecommunications networks corresponds to or comprises standalone non-public networks which are defined by mobile country code information, mobile network code information, and network identifier information.

7. A user equipment, comprising:

a processor; and a memory having processor-executable instructions stored thereon;

wherein the user equipment comprises, for a given access technology, access mode configuration information, the access mode configuration information relating to or indicating a first network selection mode and at least a second network selection mode that the user equipment is alternatively able to use, wherein each of the network selection modes allows the user equipment to select telecommunications networks based on different kinds or sets of information elements identifying each telecommunications network and/or indicating the capabilities of each telecommunications network, wherein a predefined first set of networks is related to the first network selection mode and a predefined second set of networks is related to the second network selection mode, wherein the predefined first set of telecommunications networks corresponds to or comprises public land mobile networks, wherein the predefined second set of telecommunications networks corresponds to or comprises standalone non-public networks;

wherein the processor-executable instructions, when executed by the processor, facilitate performance of the following by the user equipment:

obtaining user equipment route selection policy information, wherein the user equipment route selection policy information comprises an access mode-related validity element related to content of the access mode configuration information;

determining whether or not the access mode-related validity element corresponds to the access mode configuration information of the user equipment; and handling the user equipment route selection policy information based on the determination of whether or not the access mode-related validity element corresponds to the access mode configuration information of the user equipment, wherein:

in case that the access mode-related validity element corresponds to the access mode configuration information of the user equipment, the user equipment applies the user equipment route selection policy information by routing traffic that matches the user equipment route selection policy information according to the user equipment route selection policy information; and in case that the access mode-related validity element does not correspond to the access mode configuration information of the user equipment, the user equipment skips the user equipment route selection policy information.

8. A non-transitory computer-readable medium having processor-executable instructions stored thereon for operating a user equipment, wherein the user equipment comprises, for a given access technology, access mode configuration information, the access mode configuration information relating to or indicating a first network selection mode and at least a second network selection mode that the user equipment is alternatively able to use, wherein each of the network selection modes allows the user equipment to select telecommunications networks based on different kinds or sets of information elements identifying each telecommunications network and/or indicating the capabilities of each telecommunications network, wherein a predefined first set of networks is related to the first network selection mode and a predefined second set of networks is related to the second network selection mode, wherein the predefined first set of telecommunications networks corresponds to or comprises public land mobile networks, wherein the predefined second set of telecommunications networks corresponds to or comprises standalone non-public networks;

wherein the processor-executable instructions, when executed, facilitate performance of the following:

obtaining user equipment route selection policy information, wherein the user equipment route selection policy information comprises an access mode-related validity element related to content of the access mode configuration information;

determining whether or not the access mode-related validity element corresponds to the access mode configuration information of the user equipment; and handling the user equipment route selection policy information based on the determination of whether or not the access mode-related validity element corresponds to the access mode configuration information of the user equipment, wherein:

in case that the access mode-related validity element corresponds to the access mode configuration information of the user equipment, the user equipment applies the user equipment route selection policy information by routing traffic that matches the user equipment route selection policy information according to the user equipment route selection policy information; and in case that the access mode-related validity element does not correspond to the access mode configuration information of the user equipment, the user equipment skips the user equipment route selection policy information.

* * * * *